US010323300B1

(12) United States Patent
Tripathy et al.

(10) Patent No.: US 10,323,300 B1
(45) Date of Patent: Jun. 18, 2019

(54) PROCESS FOR RECYCLING RARE EARTH MAGNETS

(71) Applicant: Energy, United States Department of, Washington, DC (US)

(72) Inventors: Prahbat K. Tripathy, Idaho Falls, ID (US); William D Swank, Idaho Falls, ID (US); Delon C. Haggard, Idaho Falls, ID (US); Tedd E. Lister, Idaho Falls, ID (US); Eric S. Peterson, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 95 days.

(21) Appl. No.: 15/254,232

(22) Filed: Sep. 1, 2016

Related U.S. Application Data

(60) Provisional application No. 62/233,000, filed on Sep. 25, 2015.

(51) Int. Cl.
| | | |
|---|---|---|
| C22B 1/00 | (2006.01) |
| C22B 5/12 | (2006.01) |
| C22B 7/00 | (2006.01) |
| C22B 59/00 | (2006.01) |

(52) U.S. Cl.
CPC .............. *C22B 59/00* (2013.01); *C22B 1/005* (2013.01); *C22B 5/12* (2013.01); *C22B 7/001* (2013.01); *C22B 7/002* (2013.01)

(58) Field of Classification Search
CPC ........... C22B 1/005; C22B 5/12; C22B 7/001; C22B 7/002; C22B 59/00
See application file for complete search history.

(56) References Cited

U.S. PATENT DOCUMENTS

| | | | | |
|---|---|---|---|---|
| 7,255,752 B2 * | 8/2007 | Ishizaka | ................ | H01F 1/0577 148/101 |
| 8,734,714 B2 | 5/2014 | Harris | | |
| 9,657,367 B2 * | 5/2017 | Furusawa | ............... | C22B 59/00 |
| 2003/0209294 A1 * | 11/2003 | Honkura | ............... | H01F 1/0573 148/302 |
| 2013/0069269 A1 * | 3/2013 | Lee | ..................... | H01F 41/0266 264/101 |

OTHER PUBLICATIONS

Family document history including WO 2013002376 A1 (Year: 2013).*
Zatoknik, et al. "Commercial-scale recycling of NdFeB-type magnets with grain boundary modification yields products with 'designer properties' that exceed those of starting materials." Waste Management. vol. 44 pp. 48-54. doi.org/10.1016/j.wasman.2015.07.041 (Year: 2015).*

(Continued)

*Primary Examiner* — Tima M McGuthery-Banks
(74) *Attorney, Agent, or Firm* — Felisa L. Leisinger; Michael J. Dobbs; Brian J. Lally

(57) ABSTRACT

A method to separate rare earth material from a rare earth magnet. At least one embodiment comprises a method that heats a provided rare earth magnet to at least 600° C. whereby the rare earth magnet absorbs a dry gas. Separated rare earth materials are created. Magnetic rare earth materials are produced from the separated rare earth materials.

11 Claims, 7 Drawing Sheets

(56) References Cited

OTHER PUBLICATIONS

Sheridan et al. "Anisotropic powder from sintered NdFeB magnets by the HDDR processing route." Journal of Magnetism and Magnetic Materials. vol. 324 pp. 63-67. doi:10.1016/j.jmmm.2011.07.043 (Year: 2012).*

Sprecher et al. "Recycling Potential of Neodymium: The Case of Computer Hard Disk Drives." Environmental Science and Technology. Environ. Sci. Technol. vol. 48, pp. 9506-9513. dx.doi.org/10.1021/es501572z | (Year: 2014).*

* cited by examiner

☐ Nd$_2$Fe$_{14}$B
☐ Nd-Rich

US 10,323,300 B1

PROCESS FOR RECYCLING RARE EARTH MAGNETS

CROSS-REFERENCE TO RELATED APPLICATIONS

This non-provisional patent application is related to and claims priority from U.S. Provisional Patent Application No. 62/233,000 filed on Sep. 25, 2015, the complete subject matter of which is incorporated herein by reference.

STATEMENT OF GOVERNMENT SUPPORT

The United States Government has rights in this invention pursuant to DOE Contract No. DE-AC07-05ID14517 awarded by the U.S. Department of Energy.

TECHNICAL FIELD

The invention relates to a method of recycling rare earth magnets. More specifically, the presented embodiments relate to methods of separating rare earth materials from rare earth magnets.

BACKGROUND

Rare earth magnets are a pervasive component of consumer, industrial, and defense related technologies. Therefore, the demand for rare earth magnets is high and continues to grow. Recycling is now even more important because the supply of available rare earth magnets has decreased and continues to be depleted. The need to efficiently recycle the rare earth material from rare earth magnets has been identified.

Current methods of recycling rare earth magnets are inefficient. This is due, in part, to the challenges at every step of the recycling phase. One such challenge is the initial step of isolating the rare earth magnet from the device from which it needs to be separated. Traditionally, devices are shredded and ground into powders that contain rare earth materials and residual materials that could include rare earth magnet coatings and pieces of the device. The powder is then processed, sometimes in environmentally harmful ways. The processing isolates the rare earth materials from the residual materials. It is a time and energy consuming process that usually does not recover 100% of the original rare earth material. And, further processing is needed to return the rare earth materials to a rare earth magnet. Therefore, there is a need to efficiently isolate rare earth material from rare earth magnets when recycling rare earth magnets.

SUMMARY OF THE INVENTION

According to one aspect of the invention, a method to separate rare earth material from a rare earth magnet comprises providing a rare earth magnet. The provided rare earth magnet is exposed to a dry gas. The exposed rare earth magnet is heated to at least 600° C. whereby said exposed rare earth magnet absorbs said dry gas causing separated rare earth materials and residual materials to form. The separated rare earth materials are maintained in an environment that removes impurities that prevent the rare earth magnet from absorbing said dry gas during said steps of exposing and heating. Magnetic rare earth materials are produced from said separated rare earth materials.

In another aspect of the invention, a method to separate rare earth material from a rare earth magnet comprises providing a rare earth magnet having an outer material substantially surrounding said rare earth magnet and an oxygen getter. The outer material is fractured before an inert gas is provided at the rare earth magnet and oxygen getter. The provided rare earth magnet and oxygen getter are first exposed to a vacuum for a period of time sufficient to substantially purify rare earth magnet and then exposed to a continuous flow of dry gas. The exposed rare earth magnet and oxygen getter are heated to at least 600° C. whereby the exposed rare earth magnet absorbs the dry gas causing separated rare earth materials and residual materials to form. The separated rare earth materials are maintained in an environment removing impurities that prevent the rare earth magnet from absorbing the dry gas during said steps of exposing and heating. Magnetic rare earth materials are produced from the separated rare earth materials.

BRIEF DESCRIPTION OF THE DRAWINGS

Embodiments of the present invention are illustrated in the accompanying figures where.

DETAILED DESCRIPTION

While the present invention may be embodied in many different forms, disclosed herein are specific illustrative embodiments thereof that exemplify the principles of the invention. It should be emphasized that the present invention is not limited to the specific embodiments illustrated. Moreover, any section headings used herein are for organizational purposes only and are not to be construed as limiting the subject matter described.

Figure 1:
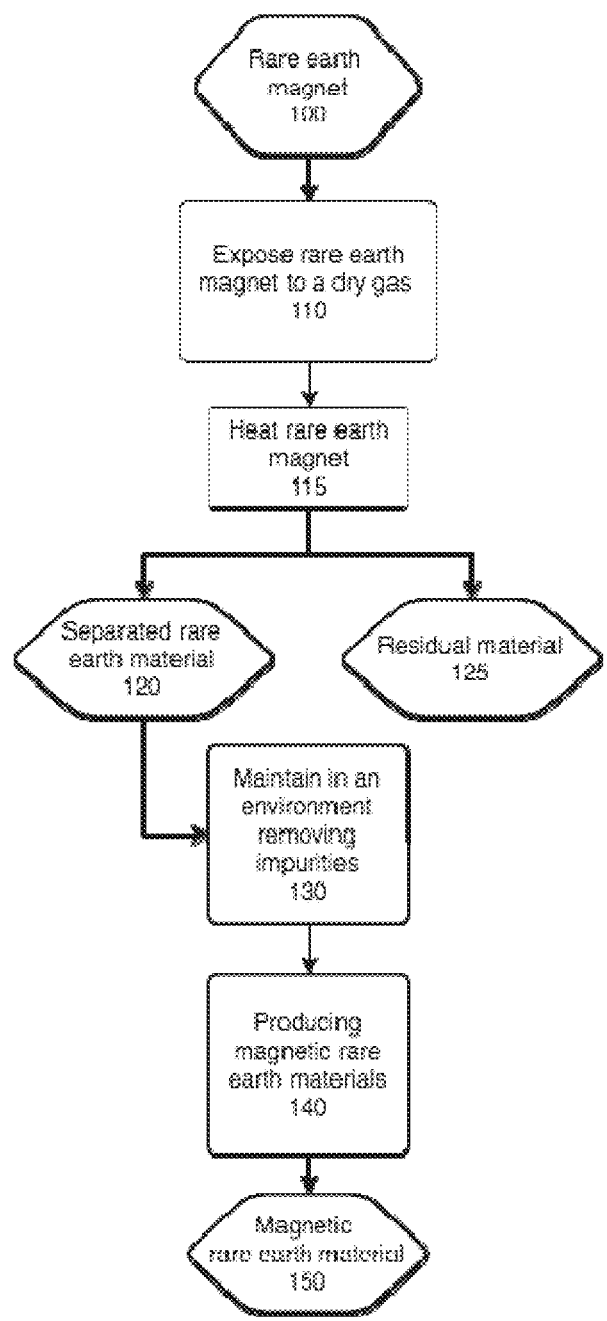
FIG. 1 is schematic flow diagram illustrating steps in a first embodiment of a method to separate rare earth material from a rare earth magnet according to the invention.

The present invention generally relates to a method to separate magnetic rare earth material from a rare earth magnet. Referring to FIG. 1, the method comprises providing a rare earth magnet 100. The provided rare earth magnet is exposed to a dry gas 110. The exposed rare earth magnet is heated 115 to at least 600° C. whereby said exposed rare earth magnet absorbs said dry gas causing separated rare earth materials 120 and residual materials 125 to form. The separated rare earth materials are maintained in an environment 130 that removes impurities that prevent the rare earth magnet from absorbing said dry gas during said steps of exposing 110 and heating 115. Magnetic rare earth materials are produced 140 from said separated rare earth materials.

The provided rare earth magnet 100 is any magnet substantially comprising rare earth material. Rare earth material contains one or more rare earth element or rare earth element alloy. Preferably, the rare earth elements are: lanthanum, cerium, praseodymium, neodymium, samarium, europium, gadolinium, terbium, dysprosium, holmium, erbium, thulium, ytterbium, lutetium, and scandium. More preferably, the rare earth material contains neodymium as neodymium magnets are strong permanent magnets. Preferably the neodymium magnet is $Nd_2Fe_{14}B$.

The provided rare earth magnet 100 is exposed 110 to a dry gas. A dry gas is a gas has less than 20% of water moisture content. More preferably, a dry gas has less than 15% of water moisture content. In an embodiment the provided rare earth magnet 100 is exposed to a dry gas 110 by continuously flowing the gas to the provided rare earth magnet 100. Preferably, the dry gas is hydrogen gas because hydrogen is easily absorbed by rare earth material creating an interstitial hydride. An interstitial hydride has metallic bonding capabilities that causes hydrogen embrittlement. In another embodiment, the dry gas is flowed at a rate of 55 liters per minute. In an alternate embodiment, the dry gas is also high purity. A high purity gas is a gas that is at least 90% pure, e.g. that it contains 10% or less of other gases. A high purity and dry gas will prevent the provided rare earth magnet 100 from becoming contaminated with other gas components and prevent the rare earth magnet 100 from undergoing unplanned chemical reactions, for example, oxidation.

The exposed rare earth magnet 110 is heated 115 to at least 600° C., more preferably 1,000° C. Heating the exposed rare earth magnet 110 to at least 6000 C causes the exposed rare earth magnet 110 to absorb the dry gas. The heating step 115 is accomplished with a heating source, preferably a furnace, more preferably a hydriding furnace. Separated rare earth materials 120 and residual materials 125 are produced when the rare earth magnet is heated 115 and absorbs the dry gas. The majority of residual materials 125 are disassociated from separated rare earth material 120. The residual materials 125 are removed from the separated rare earth materials 120. Removal is preferably accomplished using manual separation or sieving. Preferably, the removal is optimized for the desired purity of the rare earth material 120.

An unexpected benefit of this embodiment is the produced residual materials 125 are distinct from the separated rare earth materials 120. Unlike other methods to recover rare earth materials from rare earth magnets, the residual materials 125 are easily separated from the separated rare earth materials 120 without further complex processing. Another unexpected benefit of the claimed method is that heating above 600° C. preserves the anisotropicity of the rare earth magnet 100. When the rare earth magnet 100 is heated above 600° C., the separated rare earth material 120 needs no additional processing to recreate the anisotropicity of the rare earth materials. Instead, unlike other methods, the separated rare earth materials 120 retain their anisotropicity that allows the separated rare earth materials 120 to be refabricated into magnets without additional complex processing.

The separated rare earth material 120 is maintained in an environment that removes impurities 130. Removing impurities prevents unwanted reactions with the separated rare earth material 120. Oxygen is one such impurity. Exposing the rare earth magnet 100 to oxygen can cause the rare earth magnet 100 to oxidize. Oxidation decreases the quality of the rare earth magnet 100 because rare earth materials within the rare earth magnet are transformed into related oxide materials. This transformation of rare earth materials into related oxide materials reduces the amount of separated rare earth material 120 that can be produced into magnetic rare earth materials 150. Removing substantially all the oxygen that the rare earth magnet 100 is exposed to prevent the rare earth magnet 100 from being oxidized. In an embodiment the separated rare earth material 120 can be maintained in a vacuum to prevent oxygen from contacting the separated rare earth material 120.

Magnetic rare earth materials 150 are produced 140 from the separated rare earth materials 120. Preferably, producing magnetic rare earth materials 140 consists of exposing the separated rare earth materials 120 to a vacuum and heating the separated rare earth materials 120 to at least 600° C., preferably 1,000° C. Heating the separated rare earth materials 120 to at least 600° C. causes the separated rare earth materials 120 to desorb the absorbed dry gas. The separated rare earth material 120 is heated with a heating source, preferably a furnace. Preferably, the separated rare earth materials 120 are heated to a temperature that removes the majority of the dry gas from the rare earth material. In an embodiment, the separated rare earth materials 120 are exposed to a dynamic vacuum ranging from between $10^{-4}$ mbar and $10^{-6}$ mbar. The vacuum is adjusted to stay within this range while the temperature is increased. Because increasing the temperature affects the vacuum, the heating source is preferably brought to temperature slowly to ensure the desired vacuum is maintained. The vacuum and temperature are calibrated and dynamically changed to ensure neither the pressure nor temperature prevent desorption of the dry gas.

Figure 2:
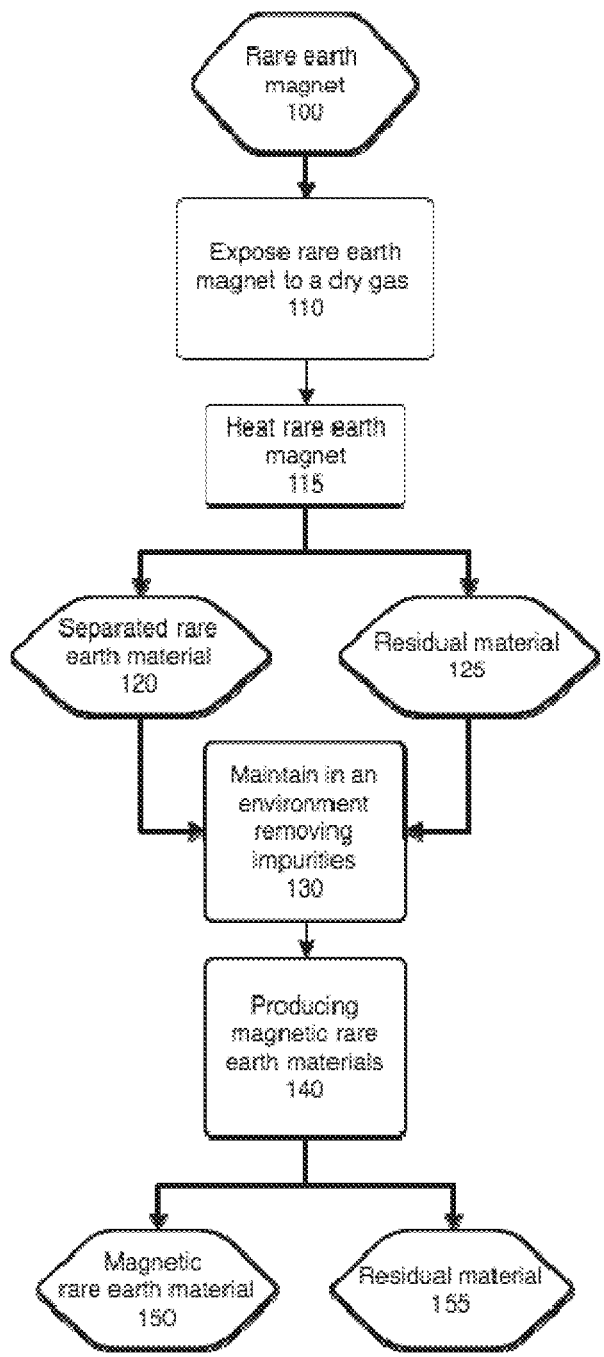
FIG. 2 is schematic flow diagram illustrating steps in a second embodiment of a method to separate rare earth materials from a rare earth magnet according to the invention.

In an embodiment, as shown in FIG. 2, the method comprises providing a rare earth magnet 100. The provided rare earth magnet is exposed to a dry gas 110. The exposed rare earth magnet is heated 115 to at least 600° C. whereby said exposed rare earth magnet absorbs said dry gas causing separated rare earth materials 120 and residual materials 125 to form. The residual materials 125 remain with the separated rare earth material 120 during the steps of maintaining in an environment that removes impurities 130 and producing magnetic rare earth materials 140. Residual material 155 and magnetic rare earth materials 150 are produced. The residual material 155 is separated from the magnetic rare earth material 150.

Figure 3:
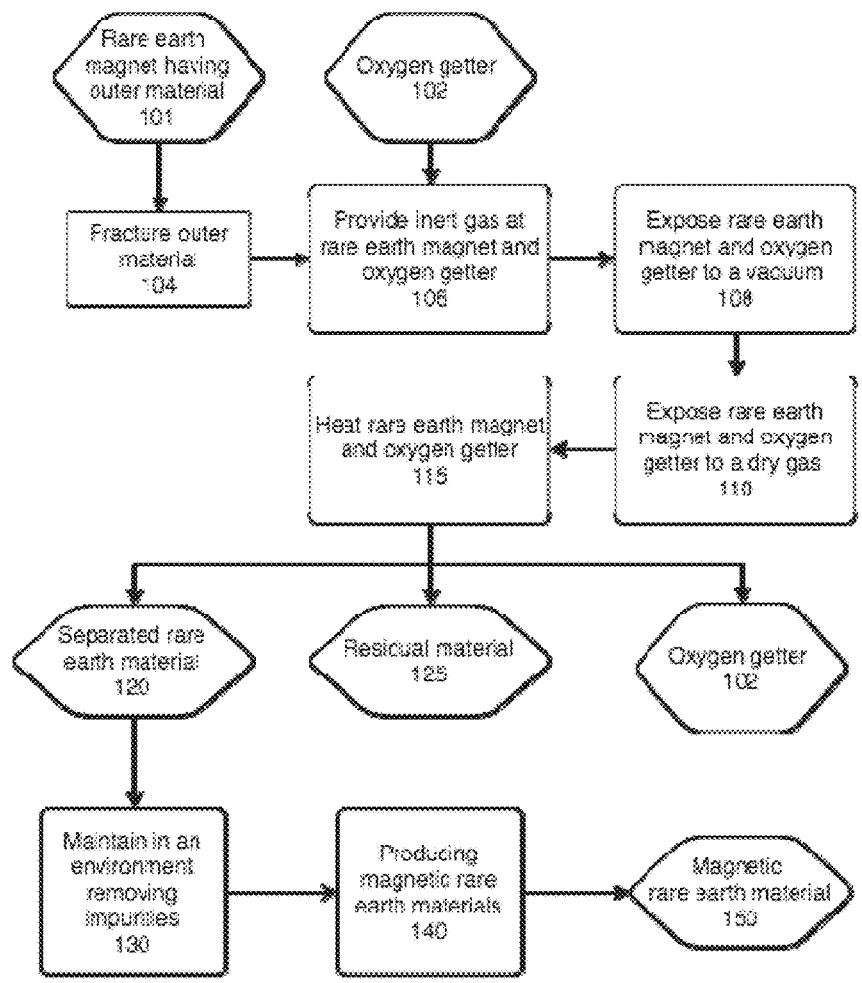
FIG. 3 is a simplified diagram illustrating a third embodiment of a method to separate rare earth materials from a rare earth magnet.

In a third embodiment, as shown in FIG. 3, the method comprises providing a rare earth magnet having an outer material 101 for increased structural integrity. The outer material is any material that prevents the provided rare earth magnet from breaking or chipping. Preferably, the outer material is rubber, metal, or plastic that substantially covers the outside of the provided rare earth magnet. More preferably, the outer material is a metal, and even more preferably, the coating is nickel or a nickel alloy.

The outer material of the rare earth magnet 101 is fractured 104. Fracturing the outer material is preferably accomplished by cracking or drilling through the outer material. Fracturing the outer material 104 of the rare earth magnet having an outer material 101 allows the rare earth magnet to be exposed.

In addition to providing a rare earth magnet having an outer material 101, an oxygen getter 102 is also provided. The oxygen getter 102 is a material designed to react and combine with oxygen to remove oxygen from the environment. The oxygen getter 102 prevents unwanted oxygen from reacting with the rare earth magnet having an outer material 101 by reacting with oxygen to absorb the oxygen. An oxygen getter 102 is added in an amount sufficient to substantially prevent oxygen from reacting with the rare earth magnet having an outer material 101. Preferably, the oxygen getter 102 is aluminum, barium, magnesium, titanium, calcium, strontium, or zirconium. In an embodiment, the oxygen getter 102 is zirconium. Zirconium can be used as a getter in solid metal alloy form. More preferably, the oxygen getter 102 is a zirconium alloy tube.

An inert gas is provided 106 at the rare earth magnet having an outer material 101 and oxygen getter 102. An inert gas is a noble gas that is non-reactive with the rare earth magnet having an outer material 101. Using an inert gas prevents unwanted reactions between the environment and the provided rare earth magnet having an outer material 101. The inert gas primarily prevents oxidation of the provided rare earth magnet having an outer material 101. As discussed above, oxidation decreases the quality of the rare earth magnet having an outer material 101 because rare earth materials are transformed into related oxide materials. Preferably the inert gas is argon. In an embodiment, the inert gas is contained in a gas tank that maintains the inert gas at a controlled rate and pressure to provide the inert gas 106 at the provided rare earth magnet having an outer material 101.

In an alternate embodiment, the rare earth magnet having an outer material 101 is exposed to a vacuum prior to the exposing step 108. The vacuum is maintained at a strength and time that is sufficient to substantially purify the provided rare earth magnet having an outer material 101 and the environment. Preferably, the vacuum is sufficient to prevent oxygen from permeating the environment and contacting the provided rare earth magnet having an outer material 101. Preferably the order of vacuum is at least $10^{-4}$ mbar. More preferably, the vacuum ranges from $10^{-5}$ to $10^{-6}$ mbar for one hour.

The rare earth magnet having an outer material 101 and the oxygen getter 102 are exposed to a dry gas 110, as discussed above. Then the rare earth magnet having an outer material 101 and the oxygen getter 102 are heated 115 to at least to at least 600° C., preferably 1,000° C., as discussed above. This causes separated rare earth material 120, residual material 125 to form and the oxygen getter 102 remains. The separated rare earth material 120 is maintained in an environment that removes impurities 130, as discussed above. Magnetic rare earth material 150 is produced 140, as discussed above.

In an alternate embodiment, the separated rare earth materials 120 are cooled prior to producing 140 magnetic rare earth materials 150. Cooling can be completed by removing the heating source prior to treatment. In other embodiments, cooling means are employed, for example by air convection, water cooling, heat pumps, etc. to remove heat from the first furnace.

In another embodiment, the produced magnetic rare earth materials 150 are a fine powder, wherein individual grains of the powder are less than 10 micron in diameter. Unlike a non-magnetic powder resulting from prior art, a soft magnetic powder will not require as much processing to refabricate into a magnet.

Experimental Results

According to an embodiment of the present invention, a neodymium magnet with a nickel outer material was provided. The dry gas was hydrogen. FIGS. 3, 4a, 4b, and 5 depict experimental results of this embodiment.

Figure 4A:
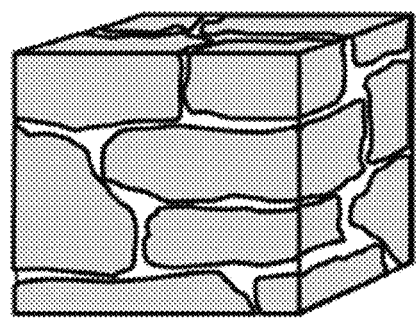
FIG. 4a illustrates an embodiment of the present invention, a biphasic neodymium magnet having a neodymium-rich phase and a ferromagnetic $Nd_2Fe_{14}B$ phase.
Figure 4B:
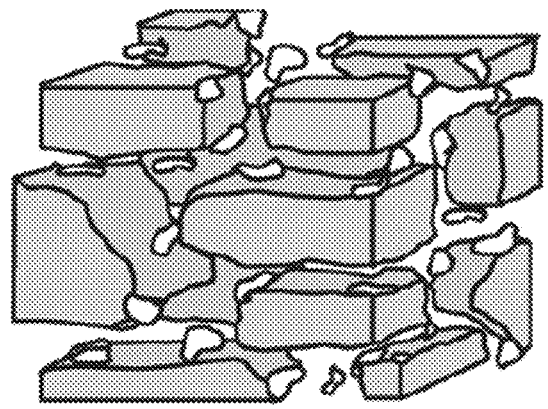
FIG. 4b illustrates an embodiment of the present invention, after the neodymium-rich phase absorbed hydrogen gas and expanded.

FIG. 4a depicts a simplified diagram, showing the neodymium magnet is primarily a biphasic material: a neodymium-rich phase and a ferromagnetic $Nd_2Fe_{14}B$ phase. FIG. 4b depicts a simplified diagram of the neodymium-rich phase after it absorbed hydrogen resulting in a neodymium hydride. The absorption initiated the absorption of hydrogen by the ferromagnetic phase. Both the neodymium hydride and the hydrogen atoms penetrated into the interstitial sites of the ferromagnetic lattice rendering the material extremely brittle. Due to a large expansion in volume in both the neodymium-rich and ferromagnetic phases, these brittle phases are transformed into fine powders. The interaction of hydrogen with the neodymium-rich and ferromagnetic $Nd_2Fe_{14}B$ phases can be described by Reactions 1 and 2, below. Reaction 1 represents the hydriding of free neodymium content, present near the ferromagnetic grain boundaries. Reaction 2 represents the hydriding of the ferromagnetic phase.

$$Nd+xH_2 \leftrightarrow NdH_{2x} \; (<500° \text{C.}) \quad \text{[Reaction 1]}$$

$$Nd_2Fe_{14}B+(2\pm x)H_2 \leftrightarrow NdH_{2+/-x}+\alpha\text{-Fe}+Fe_2B \; (>600° \text{C.}) \quad \text{[Reaction 2]}$$

Figure 5:
FIG. 5 illustrates experimental results of an embodiment of the present invention wherein the residual materials are porous sheets of nickel.

FIG. 5 depicts the separated rare earth materials and residual materials produced from this embodiment. The unexpected benefit of distinct residual materials is easily seen in FIG. 5. The porous sheets of nickel, the residual materials created from the outer material, are distinct from the separated rare earth material. The porous sheets of nickel were easily separated from the separated rare earth materials manually without further processing. The porous sheets of nickel had no pitting on both inner and outer surfaces which indicates there was no chemical interaction of the nickel coating occurred with the hydrogen gas. Therefore, there was no contamination of the separated rare earth material with the nickel coating.

Figure 6:
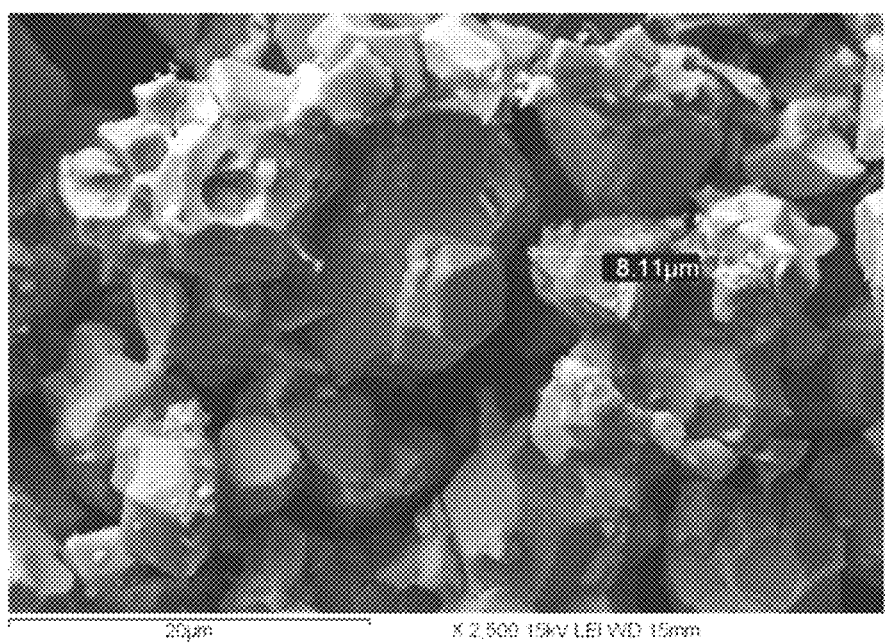
FIG. 6 illustrates experimental results of the resulting magnetic rare earth materials.

FIG. 5 depicts the magnetic rare earth materials produced from this embodiment. The resulting magnetic rare earth materials were in the form of a soft magnetic alloy powder. The soft magnetic alloy powder was a finer powder of less than 10 microns in diameter, as seen in FIG. 6. Unlike other methods, this powder would not require another milling operation to decrease the size of the powder grains for refabricating into a rare earth magnet.

Figure 7:
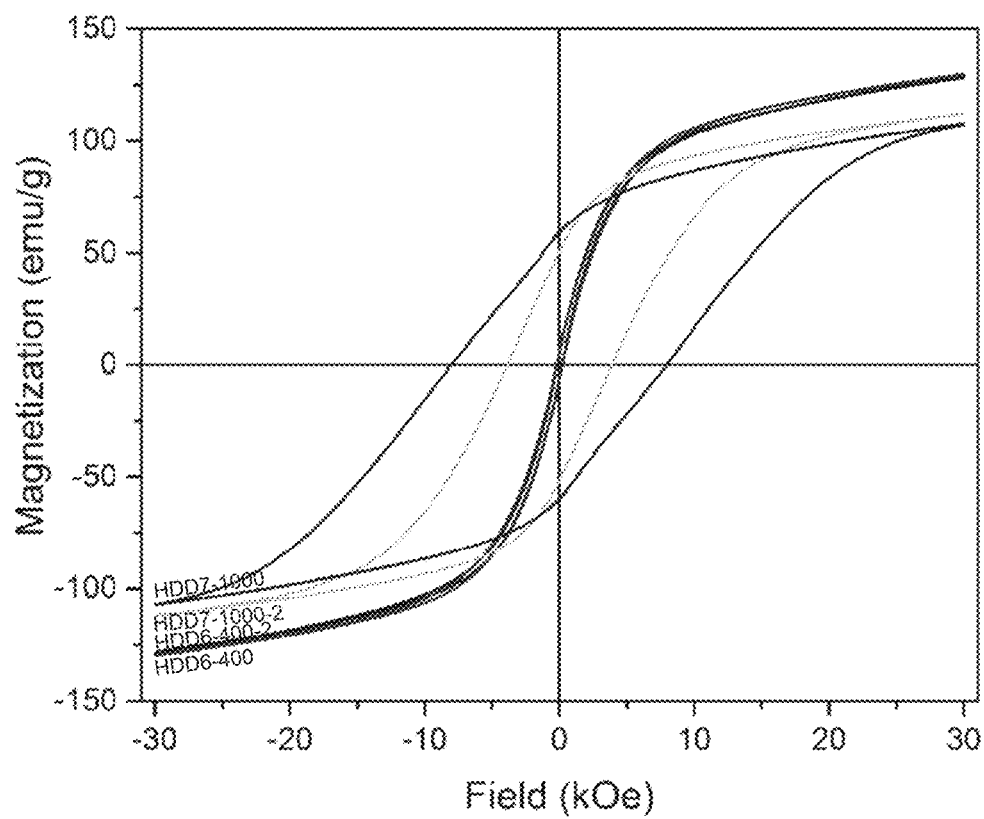
FIG. 7 illustrates experimental results of the measured magnetic moments of resulting magnetic rare earth materials.

FIG. 7 depicts the measured magnetic moments experimental results of separated rare earth materials and magnetic rare earth materials from an embodiment of the present invention. HDD6 and HDD7 were two different hard disk magnets. HDD6 was processed at 400° C. and HDD7 was processed at 1,000° C. HDD6-400-2 represents the magnetic moment of the resulting magnetic rare earth material. HDD6-400 represents the magnetic moment of the separated rare earth material. HDD7-1000-2 represents the magnetic moment of the resulting magnetic rare earth material. HDD7-1000 represents the magnetic moment of the separated rare earth material. As seen in FIG. 7, both the separated and magnetic rare earth materials processed at 1,000° C. (HDD7-1000 and HDD7-1000-2) have better magnetic properties than separated and magnetic rare earth materials processed at 400° C. (HDD6-400 and HDD6-400-2).

For the purposes of the present invention, "substantially" is defined as about twenty percent and "majority" is defined as at least 75% with preference given to higher percentages.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, 6. In particular, the use of "step of" in the claims herein is not intended to invoke the provisions of 35 U.S.C. § 112, 6.

We claim:

1. A method to separate rare earth material from a rare earth magnet, the method comprising the steps of:
   a. providing a rare earth magnet and an oxygen getter;
   b. providing an inert gas at said provided rare earth magnet and oxygen getter;
   c. exposing said provided rare earth magnet and oxygen getter to a vacuum for a period of time sufficient to substantially purify said rare earth magnet;
   d. exposing said provided rare earth magnet and oxygen getter to a continuous flow of dry gas;
   e. heating said exposed rare earth magnet and oxygen getter to at least 600° C. whereby said exposed rare earth magnet absorbs said dry gas causing separated rare earth materials and residual materials to form;
   f. maintaining said separated rare earth materials in an environment wherein impurities that prevent the rare earth magnet from absorbing said dry gas during said steps of exposing and heating are removed; and
   g. producing magnetic rare earth materials from said separated rare earth materials formed by said step of heating by exposing said separated rare earth materials to a vacuum and heating said separated rare earth materials to a temperature sufficient to desorb said dry gas.

2. The method of claim 1 wherein said dry gas is a high purity gas.

3. The method of claim 1 wherein said dry gas is $H_2$.

4. The method of claim 1 wherein said inert gas comprises an argon mixture.

5. The method of claim 1 wherein an outer material substantially surrounds said provided rare earth magnet.

6. The method of claim 5 wherein said outer material is fractured prior to said step of exposing said provided rare earth magnet to a dry gas.

7. The method of claim 1 wherein said step of maintaining said separated rare earth materials further includes:
   a. exposing said provided rare earth magnet to a vacuum for a period of time sufficient to substantially purify said provided rare earth magnet prior to exposing said provided rare earth magnet to said dry gas.

8. The method of claim 1 further comprising the step of:
   a. cooling the separated rare earth materials prior to said step of producing magnetic rare earth materials.

9. The method of claim 1 further comprising the step of:
   a. collecting said separated rare earth materials from said residual materials prior to said step of producing magnetic rare earth materials.

10. The method of claim 1 wherein said magnetic rare earth materials are a fine powder, the fine powder comprising individual grains of less than 10 micron in diameter.

11. A method to separate rare earth material from a rare earth magnet, the method comprising the steps of:
   a. providing a rare earth magnet and an oxygen getter, the rare earth magnet having an outer material substantially surrounding said rare earth magnet;
   b. fracturing said outer material;
   c. providing an inert gas at said provided rare earth magnet and oxygen getter;
   d. exposing said provided rare earth magnet and oxygen getter to a vacuum for a period of time sufficient to substantially purify said rare earth magnet;
   e. exposing said provided rare earth magnet and oxygen getter to a continuous flow of dry gas;
   f. heating said exposed rare earth magnet and oxygen getter to at least 600° C. whereby said exposed rare earth magnet absorbs said dry gas causing separated rare earth materials and residual materials to form;
   g. maintaining said separated rare earth materials in an environment wherein impurities that prevent the rare earth magnet from absorbing said dry gas during said steps of exposing and heating are removed; and
   h. producing magnetic rare earth materials from said separated rare earth materials formed by said step of heating by exposing said separated rare earth materials to a vacuum and heating said separated rare earth materials to a temperature sufficient to desorb said dry gas.

* * * * *